(12) United States Patent
Irons

(10) Patent No.: US 6,192,165 B1
(45) Date of Patent: Feb. 20, 2001

(54) APPARATUS AND METHOD FOR DIGITAL FILING

(75) Inventor: Steven W. Irons, Phoenix, AZ (US)

(73) Assignee: ImageTag, Inc., Chandler, AZ (US)

( * ) Notice: Under 35 U.S.C. 154(b), the term of this patent shall be extended for 0 days.

(21) Appl. No.: 09/001,228

(22) Filed: Dec. 30, 1997

(51) Int. Cl.$^7$ .................................................. G06F 17/30
(52) U.S. Cl. ........................................... 382/306; 707/104
(58) Field of Search ....................... 707/1, 104; 382/306

(56) References Cited

U.S. PATENT DOCUMENTS

| | | | |
|---|---|---|---|
| 3,886,328 | 5/1975 | Harms, Jr. et al. ............. 235/61.11 E |
| 3,977,509 | 8/1976 | Leersnijder . | |
| 4,283,621 | 8/1981 | Pembroke ............................. 235/375 |
| 4,553,261 | 11/1985 | Froessl . | |
| 4,587,411 | 5/1986 | Obstfelder et al. .................. 235/437 |
| 4,692,041 | 9/1987 | Dyma et al. ........................... 400/82 |
| 4,939,674 | 7/1990 | Price et al. . | |
| 4,985,863 | 1/1991 | Fujisawa et al. ..................... 364/900 |
| 5,039,847 | 8/1991 | Morii et al. .......................... 235/379 |
| 5,109,439 | 4/1992 | Froessl ................................... 382/61 |
| 5,126,540 | 6/1992 | Kashiwagi et al. .................. 235/375 |
| 5,155,341 | 10/1992 | Ohtani et al . ........................ 235/375 |
| 5,179,649 | 1/1993 | Masuzaki et al. ................... 395/148 |
| 5,188,464 | 2/1993 | Aaron ................................... 400/103 |
| 5,215,398 | 6/1993 | White et al. . | |
| 5,229,587 | 7/1993 | Kimura et al. ....................... 235/432 |
| 5,237,156 | 8/1993 | Konishi et al. ...................... 235/375 |
| 5,262,804 | 11/1993 | Petigrew et al. ................. 346/140 R |
| 5,313,572 | 5/1994 | Yamamoto et al. ................. 395/145 |
| 5,321,436 | 6/1994 | Herbert ............................ 346/140 R |
| 5,339,412 | 8/1994 | Fueki .................................... 395/600 |
| 5,384,643 | 1/1995 | Inga et al. . | |
| 5,393,961 | 2/1995 | Konishi et al. ...................... 235/375 |
| 5,430,276 | 7/1995 | Ohtani et al. ........................ 235/375 |
| 5,448,375 | 9/1995 | Cooper et al. ....................... 358/403 |
| 5,451,760 | 9/1995 | Renvall ................................ 235/462 |
| 5,452,379 | 9/1995 | Poor ..................................... 382/317 |
| 5,479,588 | 12/1995 | Sawada et al. ...................... 395/117 |
| 5,496,117 | 3/1996 | Sawada et al. ........................ 400/61 |
| 5,557,091 | 9/1996 | Krummel ............................. 235/462 |
| 5,562,309 | 10/1996 | Brink et al. . | |
| 5,848,202 | 12/1998 | D'Eri et al. . | |

OTHER PUBLICATIONS

Reference Guide for Image Search & Retrieval (IS&R) Computer–Based Training, USPTO US Department of Commerce, pp. 2–1 through 2–11 and 3–19 through 3–20, Jul. 1997.*

Image Retrieval Student Manual for the Automated Patent System (APS), US Department of Commerce USPTO, pp. 1–1 through 2–23, Oct. 1993.*

(List continued on next page.)

Primary Examiner—Jack M. Choules
(74) Attorney, Agent, or Firm—Schmeiser, Olsen & Watts; S. Jared Pitts

(57) ABSTRACT

According to the preferred embodiments of the present invention, an apparatus and method for a digital filing system is disclosed. In this context, digital filing refers to the efficient management of paper-based information from its receipt at the desktop through an indexing, scanning, image storage and image retrieval process. The preferred embodiments of the present invention provide for easy and effective indexing, imaging, storing, retrieving and managing of paper-based documents, transforming them into electronic documents using a system which incorporates many existing office resources. The proposed system and method implements a desktop solution for digital filing, which can be made available to each worker. In one embodiment of the present invention, an individual has complete control over the electronic storage and retrieval of their documents from a standard desktop computer, using a standard web browser application. Uniquely, the digital filing system of the present invention also allows users to index and label documents prior to scanning/imaging by using a dedicated desktop labeling mechanism.

65 Claims, 8 Drawing Sheets

OTHER PUBLICATIONS

Form PTO–436A, US Department of Commerce USPTO, Aug. 1992.*

Form PTO–436L, US Department of Commerce USPTO, Oct. 1978.*

W. Kowarschick; P. Vogel; and R. Bayer; "Elecktra: An Electric Article Delivery Service", Database and Expert Systems Applications, 1997, pp. 272–277.

V. Franca; C. Mendes; M. Quelez; and C. Salema, "A Station for Capture, Processing and Storing of Documents", Electrotechnical Conference, 1991, pp. 1264–1267, vol. 2.

* cited by examiner

APPARATUS AND METHOD FOR DIGITAL FILING

BACKGROUND OF THE INVENTION

1. Technical Field

This invention generally relates to processing documents and more specifically relates to a system and method for indexing, imaging, storing, and retrieving paper-based documents.

2. Background Art

While most modern computer systems can be used for business, education and entertainment purposes, the most widespread application for computers today is related to processing information. Word processing, page layout, databases, spreadsheets, and desktop publishing applications are used to prepare and disseminate information throughout society. The increased availability of computer systems and computer networks such as the Internet have made vast repositories of information available to a huge segment of our population. Indeed, as it has been widely discussed in the popular media, modern computer systems have brought our world into the "information age."

One of the promises of the information age ushered in by these omnipresent computer systems was the advent of a "paperless" society. Computers, in theory, would liberate the world from the flood of paper which currently impedes the flow and management of information. Computer-based systems with advanced information processing capabilities would supposedly allow the instantaneous electronic exchange of information from one location to another, without the necessity of "hard copy." Indeed, many businesses have embraced computer systems with the stated goal of eliminating, or at least significantly reducing, the seemingly endless stream of paper that flows into and out of an office. Reducing the burdens of paper-based information has become a widespread goal. However, the simple truth is that today we have more paper-based information, document processing labor costs, document storage overhead, and hard-copy related dependencies in our society than ever before.

In fact, the dream of a paperless society remains a faint gleam in the tired eyes of today's information workers. Reams and reams of paper continue to pile up on desktops and fill filing cabinets to overflowing in offices all over the world. If anything, the increased number of computers have exacerbated the rapidly increasing flow of paper in our society. In making information systems available to the masses, computers have allowed more and more people to generate ever growing quantities of paper which, in order to be useful, must be read and processed by someone, somewhere.

It is estimated that businesses worldwide generate more than 2 trillion pages of documents annually. In addition, in spite of the rapid proliferation of computer systems and computer users, it is estimated that less than 25% of the information used in the world today is available in a computer-accessible format. The average office worker spends 10%–40% of their time looking for information, much of it paper-based. And for every $1 spent producing a paper document, $10 dollar is spent to process and store that document. The very paperwork that drives most businesses and organizations is slowly starting to choke the productivity out of some of them as these businesses are unable to effectively and efficiently manage paper-based information.

Recognizing this problem, attempts have been made to better manage and control the paperwork that flows into the information stream each and every day. Some of these previously implemented solutions are based around the notion of creating, storing, and accessing electronic images directly in a computer system, bypassing hard copy completely. This solution makes sense only when a company or organization achieves fairly tight control over the generation and use of documents and can, therefore, effectively reduce the paper flow in certain situations. But, much of the paper burden in a given organization is directly attributable to paper-based documents that are generated by external sources. This means that most businesses and organizations, regardless of their internal systems, still receive and process paper-based information.

Other known solutions include document imaging systems which can scan paper-based documents and store/retrieve the resulting electronic images. Though many different document imaging systems have been commercialized since the late 1980s, none have gained widespread acceptance. Even though the quantifiable burdens of paper information storage, access and management are well known and uniformly decried, document imaging systems have not been broadly adopted as an alternative to the traditional filing cabinet. Document imaging systems today capture less than 1% of paper filing volumes. File cabinets continue to fill up, desktop stacks of paper continue to grow, and many business processes and desktops are still paper-bound. International Data Corporation (IDC) estimates that in 1997, U.S. business will spend $25–35 billion on filing, storing and retrieving paper. This number approaches $100 billion when the total life cycle paper management costs are calculated, according to IDC.

A key reason for continued preference of paper-based document management over electronic document imaging systems, in spite of the problems and costs associated with the use of paper, stems from a fundamental impediment to the wide-scale adoption of imaging technology in the workplace. Basically, the lack of an efficient, cost-effective, adaptable method for driving paper through the scan and index process continues to thwart the efforts of most organizations that try to adopt wide-reaching document imaging solutions. The lack of simple, office automation platforms for image capture and indexing remains a key barrier to broadened use of document imaging.

Document input (scanning and indexing) sub-systems are usually the most costly, labor-intensive, time-consuming, and error prone component of a traditional document imaging solution. To be effective, a paper-to-digital conversion system must address, at a minimum, the following activities: document aggregation; document preparation for scanning; document batching; document scanning; scanning quality controls; pre-committal image caching; document indexing; database updates; and permanent image storage. Traditional document imaging systems build an input assembly line of process workers, hardware, software, and related network activities to accomplish these tasks. They require network caching and transmission of in-process images, indexing stations with large viewing monitors to assist keystroking from the screen, and human and machine controls for the overall process of document input. The costly, integrated systems developed for these requirements generally institute a rigid process for a targeted, high-volume, structured paper flow. Because customized document input sub-systems are justified and built for targeted business applications, they do not adapt well to other, diversified document imaging needs, smaller workgroup filing systems, or ad hoc filing systems. Unfortunately, diverse, smaller workgroup filing, and ad hoc filing systems represent the bulk of paper filing. The paradigm of a document input assembly line does not match up well with many existing paper movement and filing patterns found in many businesses and organizations.

For example, most traditional document imaging systems operate a centralized input facility with dedicated scanning and indexing equipment and personnel. In this scenario, paper-based document are funneled to the "imaging" department where document imaging workers identify, batch, organize, prepare, scan and index the documents. While this system is effective for imaging a high volume, structured paper flow, it is counter-intuitive to the natural flow and use of documents in most offices, and therefore, is not applicable. Most office workers receive a paper-based document at their desk and want to use it, then file it so that they or their co-workers can quickly retrieve the document when necessary. The original user of a document is usually the most qualified person to index it. Centralized control and disposition of documents abstracts the office worker from the source of their information and isolates the two entities.

Further, many of these traditional document imaging systems also require the acquisition of expensive new equipment and the training of new workers simply to manage and process the in-coming paper-based documents. This requirement adds a cost barrier to adoption that many organizations cannot overcome. In addition, the presently available document imaging systems employ proprietary software for creating, storing, and using document images. By design, these systems limit the availability of the electronic images to the audience within the proprietary document imaging system and thereby reduce the probability of document exchange with other systems and external organizations that may require access to a given document.

The challenges of adopting and implementing paper-to-digital image solutions are not limited to the mechanics and technologies of the document image capture process. Traditional document imaging technologies also introduce significant changes to the user's desktop and to the overall flow of documents in the business process. As previously mentioned, in most large scale document imaging environments, the end user is alienated from the entire imaging/indexing process and does not control the flow or disposition of their own documents. For a paper-to-digital document solution to be truly useful, the end user must be comfortable with the process and must embrace the new methods. User adoption factors are crucial because while the burdens associated with handling paper are ingrained and often accepted, the changes involved in adopting and implementing document imaging systems are wide-reaching and potentially disruptive.

In general, the successful implementation of a paper-to-digital document solution, and subsequent successful user adoption, depends on adequately addressing at least these basic issues:

Is there significant added cost and work involved in an image input process as opposed to traditional paper filing? If so, is the added cost worth it for the resulting image utility?

Can the system blend with traditional paper usage and maximize the advantage and user preferences of each medium (paper and image) in the information life cycle?

Can an electronic solution improve on the existing paper information management process, which starts when paper arrives at the desktop?

Can users easily learn and adapt to a new way to file paper (digitally)?

Will the new system exhibit proximity to existing paper processes and office automation resources as a point of departure?

Once these issues have been successfully addressed, an acceptable solution can be developed and adopted. However, without a better system and method for overcoming the significant limitations of the present document indexing, imaging, storage, retrieval, and handling systems, the world will be increasingly dependent on antiquated solutions which are continually decreasing productivity.

DISCLOSURE OF INVENTION

According to the preferred embodiments of the present invention, an apparatus and method for a digital filing system is disclosed. In this context, digital filing refers to the efficient management of paper-based information from its receipt at the desktop through an indexing, scanning, image storage and image retrieval process. The preferred embodiments of the present invention provide for easy and effective indexing, imaging, storing, retrieving and managing of paper-based documents, transforming them into electronic documents using a system which incorporates many existing office resources. The proposed system and method implements a desktop solution for digital filing, which can be made available to each worker. In one embodiment of the present invention, an individual has complete control over the electronic storage and retrieval of their documents from a standard desktop computer, using a standard web browser application. Uniquely, the digital filing system of the present invention also allows users to index and label documents prior to scanning/imaging by using a dedicated desktop labeling mechanism.

By incorporating the ability for individuals at their desktop to quickly and easily control the identification, indexing, and storage of paper-based documents, images of these documents can be effectively assimilated into almost any work environment. By indexing the paper-based documents prior to scanning, a document inventory is created at the earliest possible moment, extending the integrity of paper and image control efforts. Indexing prior to scanning pre-builds the image storage file name prior to the scan and store activities. This simplifies the subsequent scan and store processes, reduces the system and operation costs, and enables an open image filing system so the document repositories are transportable and accessible using non-proprietary methods. Lastly, since the system removes traditional proprietary software dependencies, deployment costs are radically lower than previous alternatives.

BRIEF DESCRIPTION OF DRAWINGS

The preferred embodiments of the present invention will hereinafter be described in conjunction with the appended drawings, wherein like designations denote like elements, and.

BEST MODE FOR CARRYING OUT THE INVENTION

Figure 1:
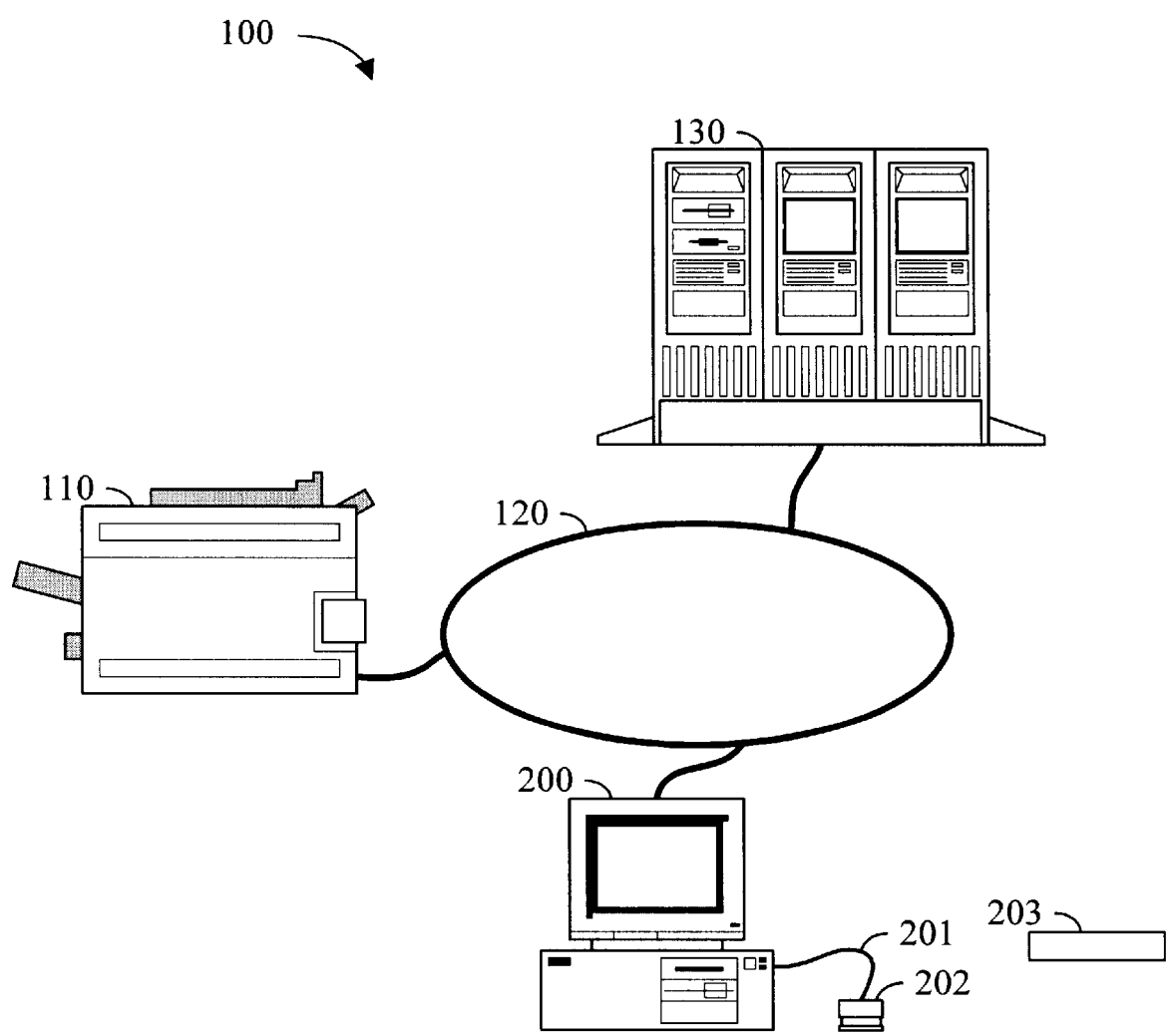
FIG. 1 is a block diagram of a digital filing apparatus for indexing, imaging, storing and retrieving documents according to a preferred embodiment of the present invention.

The present invention utilizes various concepts associated with the Internet, World Wide Web (WWW), web browsers, JAVA, and client/server transactions. For those individuals who are not familiar with these concepts, the explanations in the Overview section will provide the additional detail necessary to understand the invention. Those individuals who are familiar with these concepts may proceed directly to the detailed description section below.

1. Overview

Internet

One significant computer network that has recently become very popular is the Internet. The Internet grew out of the modem proliferation of computers and networks, and has evolved into a sophisticated worldwide network of computer systems linked together. A subset of the Internet, the WWW is a collection of linked web "pages" that presents information to a computer user in a graphical fashion. A user at an individual PC (i.e., workstation) that wishes to access the WWW typically does so using a software application known as a "web browser." Many commercial web browsers are currently available. These include applications such as IBM's WebExplorer, Netscape's Navigator, Microsoft Internet Explorer, Apple Computer's CyberDog, and any other software application which now exists or which may be developed in the future for accessing or processing information over the WWW.

A web browser makes a connection via the WWW to other computers known as "web servers," and receives information from the web server that is displayed on the user's workstation. Information displayed to the user is typically organized into pages that are constructed using a specialized language called HyperText Markup Language (HTML) or other, similar languages such as XML, etc. The transfer of information between the web browser and the web server is done in the context of a client/server relationship with the web browser being a client of the web server.

There are a number of standard protocols used in this context which are utilized with the present invention.

JAVA Computer Programming Language

JAVA is the name of one very well-known and popular object-oriented computer programming language which is used to develop software applications. JAVA's popularity stems in part from its relative simplicity and the fact that JAVA is written in a manner that allows different computers (i.e., platforms) to execute the same JAVA code. In other words, JAVA is platform-independent. This feature has caused the use of JAVA to greatly increase with the growing popularity of the Internet, which allows many different type of computer platforms to communicate with each other. Small JAVA programs, called "applets" are written to accomplish specific tasks.

2. Detailed Description

The digital filing system and methods of the present invention provide a complete solution for indexing documents, imaging/scanning documents, storing documents, and retrieving documents. By implementing the present invention, a user can quickly and easily manage paper-based documents in any business environment. The digital filing process involves receiving a paper-based document, indexing the document at the user's workstation, generating an image file name for the document, preparing a label for the document, applying the label to the document, imaging/scanning the document, electronically storing the document using the previously-generated image file name and indexing information. This process enables generic document imaging, using common office infrastructure, while adapting to various preferences for paper document disposition.

Referring now to FIG. 1, a digital filing system 100 according to a preferred embodiment of the present invention includes: a computer 200; a peripheral connection 201; desktop labeling mechanism 202; an optional folding out basket 203; a document input mechanism 110; an image storage mechanism 130; and a communication link 120. Digital filing system 100 provides a way for office workers to index, store, and manage documents received from others.

Peripheral connection 201 is any suitable mechanism for connecting a computer peripheral device to a computer or computer network. This includes both serial and parallel communication cables such as an industry standard Small computer System Interface (SCSI) connection, an RS-232 connection, wireless infrared connections, etc. The most preferred embodiment for peripheral connection 201 is a direct physical connection via an industry standard cable attached to an input port on computer 200. However, it should be noted that, although peripheral connection 201 is shown in FIG. 1 as being attached directly to computer 200, a direct connection to communication link 120 is also possible and, in some situations, may be more preferred.

Desktop labeling mechanism 202 represents a label generating device which is connected to computer 200 via peripheral connection 201. Desktop labeling mechanism 202 is a specialized printer which is capable of printing labels that include a computer readable two-dimensional bar code or other high-density symbology along with corresponding human readable information (i.e., eye-legible content). The bar codes generated by desktop labeling mechanism 202 preferably conform to the public domain industry standard PDF 417 bar code label format or other high-density symbology and the eye-legible content provides information to the user regarding the document. A representative label is further described in conjunction with FIG. 4 below.

Folding out basket 203 is an optional accessory that can be effectively utilized with system 100. Folding out basket 203 is provided as a physical desktop storage location for paper-based documents after they have been indexed and labeled by the user. The paper-based documents can be staged in the folding out basket during the day and then transported to a centralized scanning location for batch scanning at predetermined intervals or on an as-desired basis.

Document input mechanism 110 is any type of device which is capable of scanning or imaging a document. For paper-based documents, flatbed scanners, drum scanners, digital copiers, fax machines, multi-function copiers ("mopiers"), etc. are all examples of document input mechanisms 110 which can be used in various embodiments of the present invention. The purpose of document input mechanism 110 is to scan/image a paper-based document and create a digital image of the paper-based document for storage on image storage mechanism 130. In addition, digital transmission of e-mail, faxes etc. may also be considered to be various forms of document input mechanism 110. If the document is already a digital image, then there is no need to scan the document, and the image can be stored according to the method described in FIG. 7.

Image storage mechanism 130 represents large scale secondary storage for storing images which are scanned/imaged by document input mechanism 110. Various components such as hard disk drives, recordable CD-ROM and DVD drives and jukeboxes, magnetic tapes, and other devices known to those skilled in the art may be used to implement image storage mechanism 130. Digital document images captured by document input mechanism 110 may be transmitted to image storage mechanism 130 via communication link 120. Image storage mechanism 130 may contain removable, transportable, image storage media, such as magneto-optical media, a DVD disk, or a CR-ROM disk.

Communication link 120 is any suitable computer communication link or communication mechanism, including a hardwired connection, an internal or external bus, a connection for telephone access via a modem or high-speed T1 line, infrared or other wireless communications, computer network communications over the Internet or an internal network (e.g. Intranet) via a wired or wireless connection, or any other suitable connection between computers and computer components, whether currently known or developed in the future. It should be noted that portions of communication link 120 may be a dial-up phone connection. Computer 200 is described below in conjunction with FIG. 2.

In operation, a paper-based document is received by a user of system 100. The user will use system 100 to index and name the document. The indexing information is automatically stored in a record in an image index database at the time of indexing. System 100 generates a document number which will subsequently become an image file name when the paper-based document is scanned or imaged and the image of the document is created. The document number is used to effectively link the document image to the record in the database, facilitating later retrieval of the document image. Then, computer 200 communicates with desktop labeling mechanism 202 and desktop labeling mechanism 202 generates a label for the paper-based document that details the document name and any other descriptive information used to identify the document.

After the label has been generated and applied to the first page of the incoming document, the document is inputted into system 100 using document input mechanism 110. Instead of placing a label on the first page only, a bar-coded label may be placed on each page of a paper-based document prior to scanning. When the paper-based document is subsequently scanned, an image of the paper-based document (including the label) is created and the bar code portion of the label on the first page is decoded. Using this decoded information, the previously-created document number is extracted from the bar code. After imaging/scanning, the image of the paper-based document is stored in an image repository in a default storage location, such as on image storage mechanism 130, using the previously generated document number as the image file name for the image, thereby linking the document image to a record in an image index database.

Communication link 120 provides for communication between the various components of system 100 and allows the document image to be transmitted from device to device. In this fashion, a user can quickly and easily gain access to the electronic images of paper-based documents. Examples of communication link 120 include a Local Area Network (LAN), an Intranet, or the Internet. Communication link 120 logically links the physical components of system 100 together, regardless of their physical proximity. This is especially important because in many preferred embodiments of the present invention, it is anticipated that computer 200, document input mechanism 110, and image storage mechanism 130 will be geographically remote and that the indexing process, scanning/imaging process, and storage process will occur in sequential order but will be operationally independent. By labeling the document prior to scanning, and by pre-establishing the image storage file name and including the file name in the label, this method removes the need for any other communication or connectivity between the index, scan, and storage processes.

While designed primarily to deal with incoming paper-based documents, as mentioned earlier, it is also contemplated that incoming electronic documents (e-mail, documents downloaded from the Internet, etc.) could also be indexed and stored using system 100. In the case of electronic documents, the scanning/imaging of the document would not be necessary.

Figure 2:
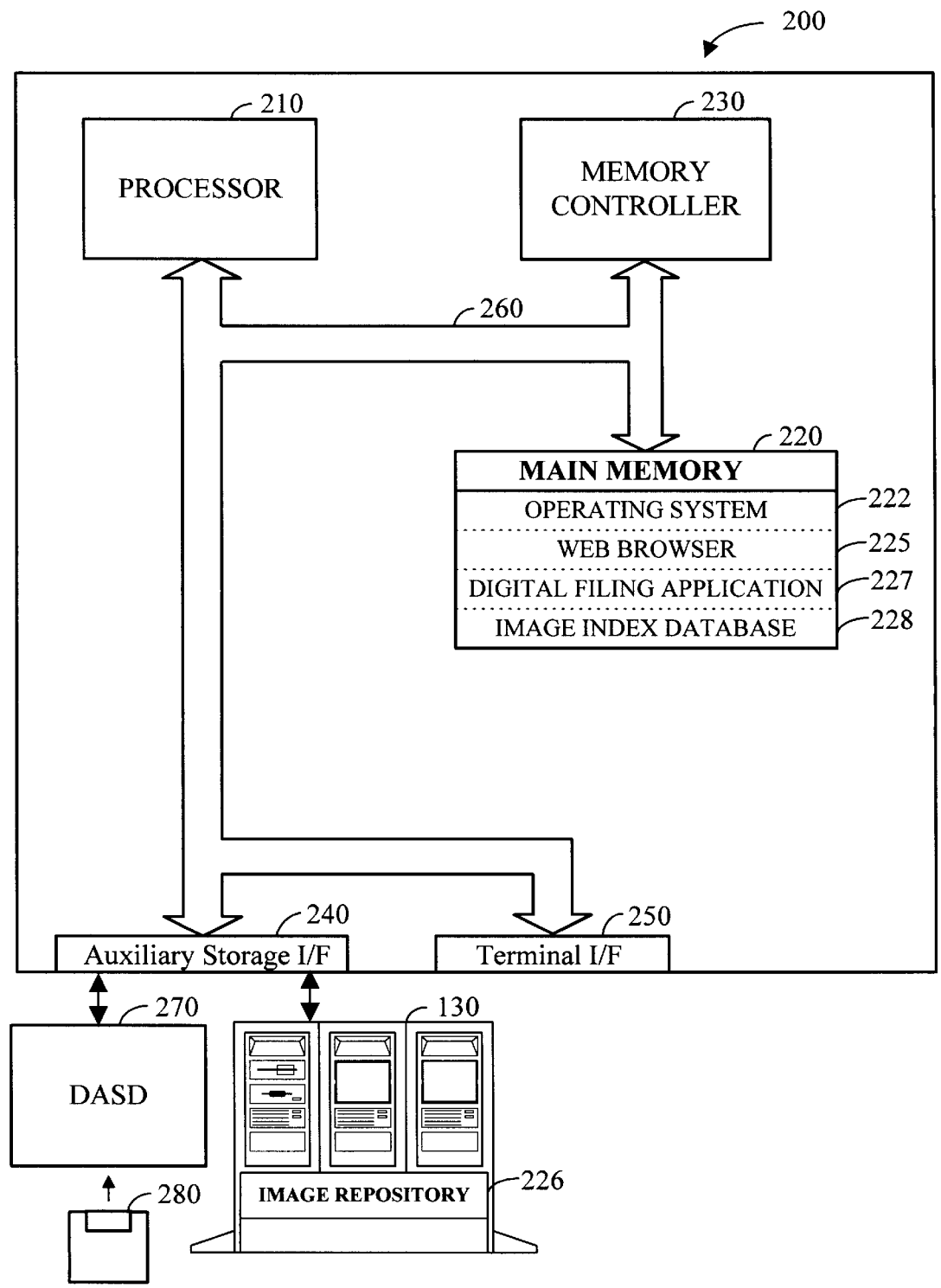
FIG. 2 is a block diagram of a computer suitable for use with the apparatus of FIG. 1.

Referring now to FIG. 2, a computer 200 in accordance with a preferred embodiment of the present invention is an IBM compatible personal computer system. However, those skilled in the art will appreciate that the methods and apparatus of the present invention apply equally to any computer system, regardless of whether the computer system is a complicated multi-user computing apparatus or a single user device such as a personal computer or workstation. Computer 200 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to computer system 200 illustrated in FIG. 2 within the scope of the present invention such as the addition of cache memory or other peripheral devices. For example, computer 200 will also include a monitor or other display device (not shown) connected to the system bus 260. FIG. 2 is not exhaustive, but is presented to simply illustrate some of the salient features of computer system 200.

Processor 210 performs computation and control functions of computer 200, and comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor. Processor 210 suitably executes an object-oriented computer program 222 within main memory 220.

Auxiliary storage interface 240 allows computer 200 to store and retrieve information from auxiliary storage devices, such as image storage mechanism 130, magnetic disk drives (e.g., hard disks or floppy diskettes) or optical storage devices (e.g., CD-ROM). One suitable storage device is a direct access storage device (DASD) 270. As shown in FIG. 2, DASD 270 may be a floppy disk drive which may read programs and data from a floppy disk 280. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type or location of signal bearing media used to actually carry out the distribution. Examples of signal bearing media include: recordable type media such as floppy disks (e.g., disk 280) and CD ROMS, and transmission type media such as digital and analog communication links, including wireless communication links.

Memory controller 230, through use of a processor (not shown) separate from processor 210, is responsible for moving requested information from main memory 220 and/or through auxiliary storage interface 240 to processor 210. While for the purposes of explanation, memory controller 230 is shown as a separate entity, those skilled in the art understand that, in practice, portions of the function provided by memory controller 230 may actually reside in the circuitry associated with processor 210, main memory 220, and/or auxiliary storage interface 240.

Terminal interface 250 allows system administrators and computer programmers to communicate with computer system 200, normally through programmable workstations. Although computer 200 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multidrop bus, any connection means that supports bi-directional communication in a computer-related environment could be used.

Main memory 220 suitably contains an operating system 222, a web browser 225, a digital filing application 227; and an image index database 228. The term "memory" as used herein refers to any storage location in the virtual memory space of computer 200.

It should be understood that main memory 220 will not necessarily contain all parts of all mechanisms shown. For example, portions of operating system 222 may be loaded into an instruction cache (not shown) for processor 210 to execute, while other files may well be stored on magnetic or optical disk storage devices (not shown). In addition, although image index database 226 is shown to reside in the same memory location as operating system 222, it is to be understood that main memory 220 may consist of multiple disparate memory locations.

Operating system 222 includes the software which is used to operate and control computer 200. Operating system 222 is typically executed by processor 210. Operating system 222 may be a single program or, alternatively, a collection of multiple programs which act in concert to perform the functions of an operating system.

Web browser 225 can be any web browser software application currently known or later developed. Examples of suitable web browsers 225 include Microsoft Internet Explorer and Netscape Navigator. It is anticipated the other vendors will develop web browsers that will be suitable for use with the various preferred embodiments of the present invention.

Image repository 226 can be any type of computer filing or storage structure known to those skilled in the art. In the most preferred embodiments of the present invention, image repository 226 is simply a directory or subdirectory containing a series of images where each image has a unique file name created and assigned as explained below in conjunction with FIGS. 5 and 6. Alternatively, image repository 226 may be a Structured Query Language (SQL) compatible database file capable of storing records containing images. In one preferred embodiment, image repository 226 is an image directory on a DVD disk which can be easily transported from one geographic location to another.

Digital filing application 227 works in conjunction with web browser 225 to provide the various functions of the present invention including a user interface and indexing tools used to prepare a document for subsequent scanning/imaging and electronic filing. Digital filing application 227 also incorporates a database engine to provide record management capabilities (add, modify, delete, etc.) for image repository 226 and image index database 228 and various administrative utilities.

Preferably, image index database 228 is a Structured Query Language (SQL) compatible database file capable of storing information, including indexed document names, for the images stored in image repository 226. In addition, image index database 228 may be physically located in a location other than main memory 220. For example, image index database 228 may be stored on an external hard disk drive (not shown) coupled to computer 200 via auxiliary storage I/F 240.

It should be noted that an image or images from image repository 226 may be loaded into main memory 220 and/or a cache memory storage location (not shown) for viewing by digital filing application 227 and web browser 225. As is typical for web browsers, previously viewed images may be recalled by using a "back" or "forward" button. Since the present invention works with standard web browsers, this functionality will be available for images viewed using digital filing application 227.

Figure 3:
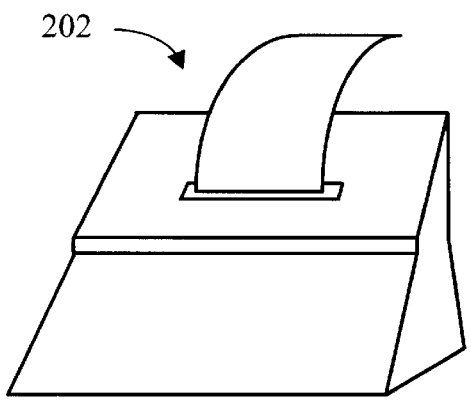
FIG. 3 is a perspective view of a desktop document labeling mechanism according to a preferred embodiment of the present invention.

Referring now to FIG. 3, a desktop labeling mechanism 201 according to a preferred embodiment of the present invention is shown. In a first preferred embodiment, desktop labeling mechanism 202 generates a bar code and eye-legible information on linerless label stock. The labels are then transferred by hand to a paper-based document which is to be scanned and stored using system 100 of FIG. 1.

Figure 3A:
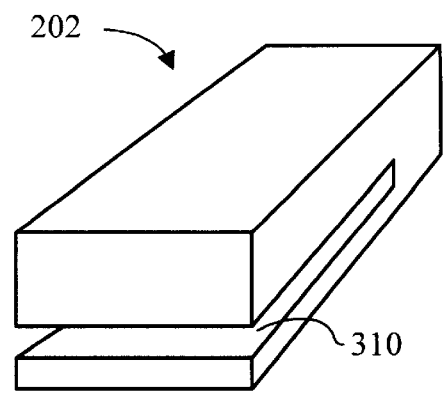
FIG. 3a is a perspective view of a desktop document labeling mechanism according to an alternative preferred embodiment of the present invention.

Referring now to FIG. 3a, an alternative preferred embodiment of desktop labeling mechanism 202 prints and applies (like an electronic stapler) a label directly onto the paper-based document. As shown in FIG. 3a, desktop labeling mechanism 201 has an opening 310 for receiving paper-based documents or pages of a paper-based document. The user can insert the paper into opening 310 and desktop labeling mechanism 202 will apply the label directly to the paper. In yet another alternative preferred embodiment of desktop labeling mechanism 202, the label information (bar code and eye-legible content) is printed directly on the paper-based document without using a separate label. The content of the bar code and eye-legible information is discussed in conjunction with FIGS. 5 and 6 below.

Figure 4:
FIG. 4 is a label generated by the document labeling mechanism of FIG. 3.

Referring now to FIG. 4, a sample label 400 generated by desktop labeling mechanism 201 is illustrated. As shown in FIG. 4, label 400 contains two separate portions, an eye-legible information portion 410 and a computer readable bar code portion 420. Eye-legible information portion 410 is provided as a convenience for the user of system 100 and provides basic information about a paper-based document or about how the paper-based document is to be processed. Computer readable portion 420 is used to store the image file name to be used when the scanned image is stored on image storage mechanism 130 of FIG. 1. While the information contained in these two different portions may be identical, for security reasons the information in these two different portions may be different. It should be noted that the use of high-density symbology to encode the image file name may include many different types of symbology. This includes those symbologies that represent digital information as shading within an icon or any other symbology capable of representing large quantities of information in a digital format. Also note that the bar code or machine readable portion of the label may include additional information. For example, information on document disposition or additional index data for the document.

Figure 5:
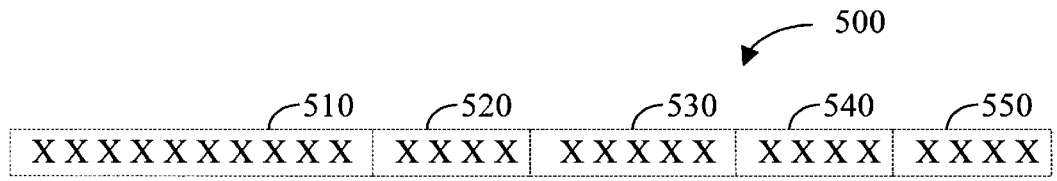
FIG. 5 is a generic illustration of a document naming and labeling convention according to a preferred embodiment of the present invention.

Referring now to FIG. 5, a generic description of the content of a label 500 according to a preferred embodiment of the present invention is described. As shown in FIG. 5, label 500 includes a unique document number, which becomes the image file name after the document is scanned and is comprised of the following components: a software serial number field 510; a security field 520; an indexing date field 530; a UserID field 540; and a document counter field 550. Software serial number field 510 is used to identify a unique customer. It is anticipated that each copy of the software program which provides the features of the present invention will have a unique serial number associated with it. This will provide a unique code to identify each user of a system 100 that, when concatenated with the other numbers, will guarantee that each document number will be globally unique. This is important because it is anticipated that third party vendors will be providing storage space for images and vendors must have a reliable method of uniquely identifying, segregating, securing, and storing images from multiple clients.

Security field 520 is used to provide various security features, such as a user-established code to ensure that document numbers are established under the control or security of the company that owns the documents. In addition, security field 520 can customized and configured to provide internal security measures, thereby limiting access to sensitive document images. Indexing date field 530 provides the date that the document was indexed by the user of system 100. UserID field 540 is used to identify the user who indexed the document for storage. The identity of the user is typically determined by the system via logon ID. Document counter field 550 is used to track the number of documents indexed by a user on a given date.

Figure 6:
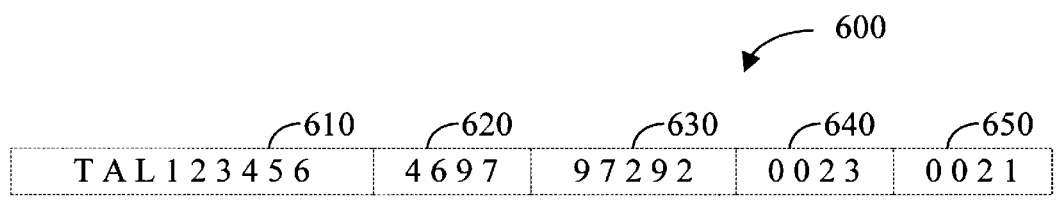
FIG. 6 is a specific illustration of a document naming and labeling convention according to a preferred embodiment of the present invention.

Referring now to FIG. 6, a specific example of a label 600 with field components corresponding to FIG. 5 is illustrated. As shown in FIG. 6, software serial number field 610 contains "TAL123456." This identifies a specific customer and can pinpoint the licensed digital filing application software that issued that specific document number. As shown in FIG. 6, security field 620 contains a security code "4697" which describes a user-defined security aspect for accessing this particular document. Indexing date field 630 contains "97292" which is the Julian date representation for the date of the indexing session (i.e., Oct. 19, 1997). UserID field 640 contains the user identification number "0023. This indicates that user 0023 is the user who indexed the document. Document counter field 650 contains "0021" which indicates that this particular label is being generated for the $21^{st}$ document indexed on this date by this user. To create an image storage file name, a file name extension is appended to the number shown in FIG. 6. To accommodate image file formats and conventions that require unique file names for each individual page of a multi-page document, an optional page-numbering field may also be appended to the number shown in FIG. 6. In addition, other fields for other purposes may also be added. It is contemplated that various additional fields will be developed for specific processing environments.

Figure 7:
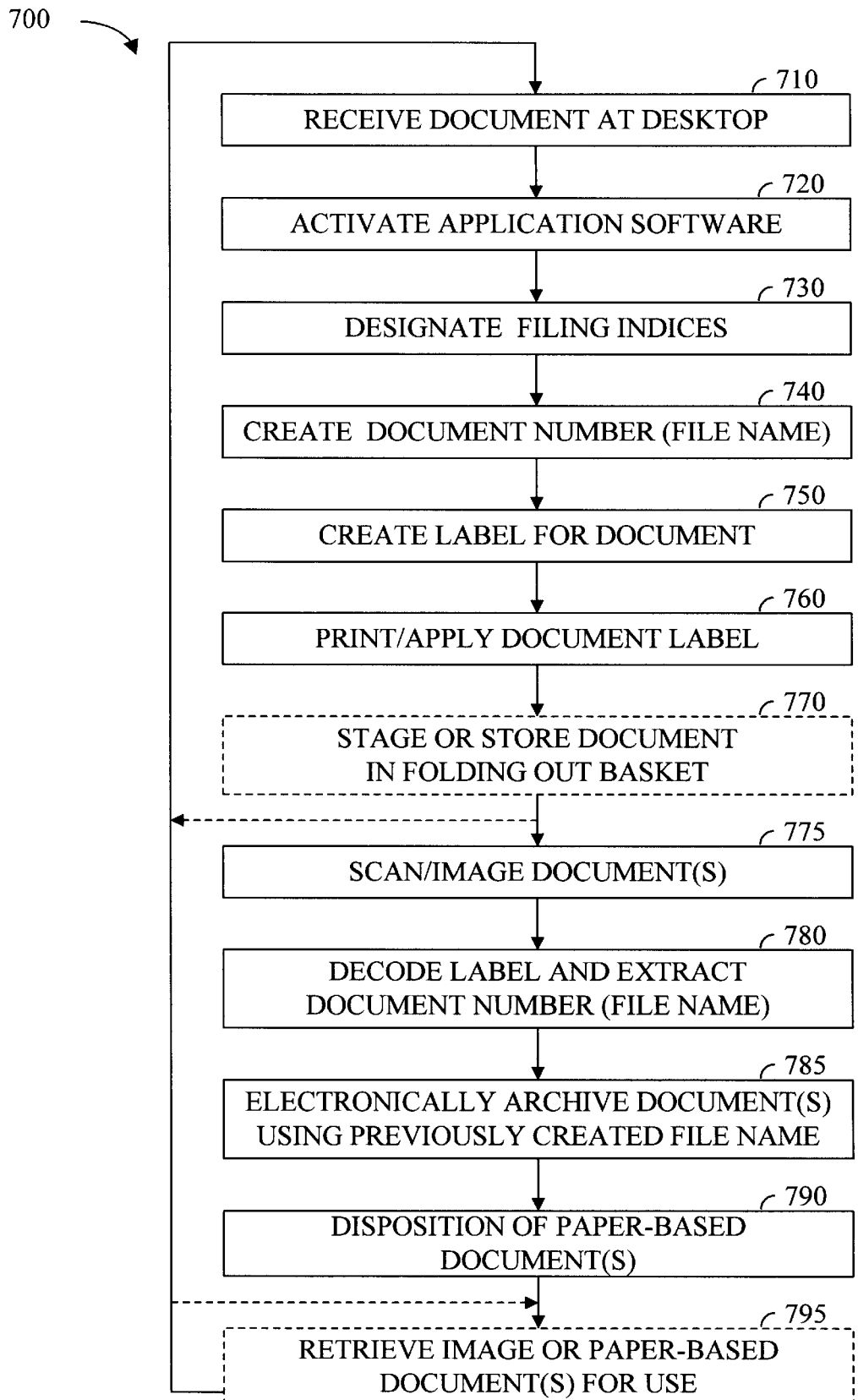
FIG. 7 is a flow chart for processing paper-based documents according to a preferred embodiment of the present invention

Referring now to FIG. 7, a method 700 for processing documents according to a preferred embodiment of the present invention is illustrated. As shown in FIG. 7, the method begins when a document arrives at a user's desktop (step 710). When the user is ready to index the document, the user will activate digital filing application 227 to index documents (step 720). While digital filing application 227 may be a stand-alone software package, in the most preferred embodiment, digital filing application 227 is a web browser-based program that, when invoked, automatically launches a web browser such as Microsoft Internet Explorer and works directly with the web browser software to index, label, and retrieve documents. Digital filing application 227 may also be implemented as a JAVA applet or a plug-in for a web browser.

After activating digital filing application 227, the user can access the user interface and designate the filing parameters and indices for the document being indexed (step 730). It should be noted that the physical storage location of image index database 228 and/or image repository 226 may be a local hard drive on the user's computer system, a network storage device at the user's location, or some storage location in a physically and/or geographically different location.

Next, image index database 228 will create the document number which will eventually become the image file name for the document (step 740) according to the conventions illustrated above in FIGS. 5 and 6. Then, digital filing application 227 will create a label 400 (step 750) and print label 400 for the document (step 760). As explained earlier, label 400 is generated by desktop labeling mechanism 202 and is subsequently applied to the document by the user or by desktop labeling mechanism 202. Using this process, a user tells system 100 how to file the document and the filing instructions are "tagged" onto the document. Once a document has been tagged or labeled, the document becomes linked to system 100 and is an intelligent, self-managing document.

After the document has been indexed and labeled, the document can optionally be stored in a folding out basket, awaiting subsequent scanning/imaging (step 770). Next, the paper-based document is scanned or imaged using a scanning sub-system (step 775), thereby creating an electronic image of the document. After the scanning process, bar code portion 420 of label 400 is decoded by the scanning sub-system and the previously created document number/image file name is extracted from bar code 420 (step 780). Using the instructions printed on label 400, the document image is electronically archived in a specified location on image storage mechanism 130, incorporating the previously created document number/image file name (step 785) with an appended file name extension such as .tif to identify the type of image that has been stored. Operational rules, color-coded out baskets, eye legible label content or other user-determined methods will determine the disposition of the paper-based document (step 790) after scanning (e.g. return in out basket to originator, file centrally, destroy, etc.) After image storage, the document image can optionally be retrieved (step 795) by the user for review, printing, editing, etc. In addition, the paper-based document can be retrieved (step 795) using a document organization schema, if the paper-based document has been retained. As shown by the dashed arrow lines in FIG. 7, a user can repeat the indexing and labeling process for additional paper-based documents and then batch scan the staged documents all at once. In addition, step 795 can be repeated for as many documents or document images as desired.

To retrieve the document image, the user will invoke digital filing application 227 in conjunction with web browser 225 and employ the user interface to select the desired document image. Digital filing application 227 references image index database 228 and uses the unique document number previously created for the desired document image to locate the document image in image repository 226. Web browser 225 will use file name extension of the image to identify the software support necessary to display the image. The software support for image display, faxing printing, integration, etc. can be provided directly by web browser 225 or, alternatively by web browser 225 invoking other, supporting application software programs as necessary. As suggested by the arrows in FIG. 7, this process can be repeated for each and every document that the user receives, if desired.

A system setup allows the user to specify the default location for image repository 226 such as a main system secondary storage location or a third party storage location. In addition, when system 100 is initially installed, the system parameters can be set to work with images in any standard image file format, such as TIFF or PDF. Additionally, the scanning/imaging software can be configured to output any standard image file format and to use a default scan mode, such as TIFF. Although system 100 is originally configured with various defaults, the user can override the defaults and optionally select a different image format for scanning/imaging documents and/or storing document images. System 100 will automatically write an appropriate file name extension according to the image file format selected by the user, or the default file format where no override is exercised by the user.

It should be noted that several significant departures from traditional document image processing systems have been adopted in the methods of the present invention. According to the methods of the present invention, paper-based documents are indexed on demand, then physically labeled with a link to their index, prior to scanning. A portion of the label contains a computer or machine-readable image filename, created by digital filing application 227 and residing in image index database 228. The image file name is used by the scan sub-system to name the image when it writes the document image to image repository 226, thereby completing the input process. This eliminates the need for the extensive hardware, software, network integration, and system and user process which is necessary when indexing occurs after scanning. For example, image indexing stations with large viewing monitors, network and local image caching and cache management, image input process staging, scan-index work scheduling, image indexing work, and update-write-commit activity are not needed with the preferred embodiments of the present invention.

The present invention, by pre-defining the image file name and using it as the link between image index database 228 and the document images contained in document image repository 226, eliminates the need for a post-scan process to either update the image index database with an image storage location pointer, or to establish an intermediate lookup table for that purpose. Using the bar code to represent the final image file name and to transport that file name with the related document is different from conventional document bar coding strategies that use bar-coded data solely to point to a database record housing additional, related index information. These methods, part of the unique strategy of indexing documents prior to scanning, make it possible to implement a generic document imaging solution, i.e. "digital filing."

In addition, the traditionally step-wise processes of monolithic imaging solutions have been isolated and separated into components that can be implemented independently, in many different ways. The operations for indexing, scanning and storing documents can be physically, temporally, and/or logically separated or disconnected. This allows optimized operational components to be assembled and implemented to best serve the needs of the users of the system. This process also allows the user to initiate control at the point of document receipt, i.e. the user's desktop. Control over the document is maintained by the user from initial receipt to the final disposition of the document and the transition of the paper-based document to a digital image. Finally, this compartmentalized digital filing process also provides a way for portions of the process to be outsourced to third party service providers that are logically disconnected from the indexing process.

For example, indexed and labeled documents can be scanned at a third party service provider location where the scanning subsystem will know how to name the image files based on the document label. Since these third party vendors will not be part of a dedicated system, the document input mechanism will not be logically connected to the computer system that indexed the documents. Digital images of the paper-based documents can be written to a removable, transportable image storage media (CD-ROM, DVD, etc.) for return to the originating system, where the existing image index database will know how to access the images based on the file name. And/or, the images can be physically stored at a third party service provider facility, such as an Internet Service Provider, because image retrieval requests are web browser-based, employ Internet conventions, standard client-server processes, and reference a document number which identifies the document owner and coincides with the image filename at the designated location. Once again, image storage mechanism 130 is normally not logically connected to computer 200 at the time of image scanning or image storage, only at the time of image retrieval. This is in direct contrast to the traditional monolithic document imaging systems or hybrid outsourcing services of the past and is possible because the user of system 100 indexes the document and the system creates the storage file name for each document before the document is scanned.

Digital filing application 227 can be provided as a single-user product and in network-aware versions. For the network version, image repository 226 and image index database 228 reside on a server connected to any network, Intranet, or Internet. For networking environments, the digital filing application 227 is downloaded from the network and the images, document numbers, and image index database records are all transferred via network interactions.

In addition, by implementing the user interface for the digital filing system as a web browser plug-in or JAVA applet, the standards, availability, functionality, and features of web browsers can be leveraged and utilized to great advantage. For example, the imaging engines already used by web browsers for viewing images can be used to provide on-screen visual representations for the imaged documents. An imaged document may be stored using the industry standard image formats known to those skilled in the art or later adopted in the industry. Since most standard web browsers can already read and display these various image formats, or automatically invoke other resources (i.e. third party document viewer web browser plug-ins) to display these standard image formats, there is no need to develop or provide proprietary image display, print, fax, e-mail, etc. mechanisms.

By establishing an open image file storage system where the image indexes are managed and maintained by a standard SQL database, the images are easily imported or exported into more sophisticated storage systems as the need arises. Since the digital images are stored in non-proprietary formats and are accessible via standard software packages, the digital images are easily transferred from one hardware/software platform to another. This feature allows a user and third party applications (document management systems, workflow systems) to easily access or change image repository storage facilities or to simply move document images from system to system as the user's needs change.

Further, by isolating the indexing operation from the scanning and storage operation and by isolating the scanning operation from the indexing and storage operation, significant advantages can be realized. Specifically, it is anticipated that commercial third party service providers such as Kinkos and AlphaGraphics which provide service centers at various locations nationwide will enter the document scanning market. A user can index and apply a label 400 to documents in a batch, then transport the batch of indexed documents to a third party scanning service provider. The service provider scans the previously indexed documents and stores digital images of the documents onto a recordable, transportable media (i.e., CD-ROM, DVD, etc). The third party scanning service provider's software is an extension of digital filing application 227 and will, therefore, be capable of naming the digital images according to the name stored in each document's bar code portion 420. When the transportable media is re-introduced to system 100 a the user's location, image index database 228 can locate the scanned images by using the document number, which is now the image file name. As an alternative to transportable media, images can be moved from a scan service provider back to the user site by any known communication lines. This method of outsourced scanning allows users to implement digital filing without incurring the costs of procuring dedicated scanning subsystems. Third party scanning can also be used for bulk, backfile conversions of existing documents.

Finally, third party document image storage providers can allocate storage space for a user's document images without worrying about the details of indexing and scanning. Fax machines, or similar machines modified for this specific purpose, can be used to scan and transmit images to third party image storage providers. Images can be transmitted over standard dial-up lines (like a present day fax transmission), dedicated communication lines, or the Internet. Users will be able to rent or lease storage space for their document images and will not be required to invest precious resources in the physical facilities and computer equipment necessary to archive volumes of digitized images. By using web browser 225 and digital filing application 227, a user can navigate to the desired storage location and access the stored image files, wherever they may be physically stored. This allows businesses to quickly and affordably adopt digital filing solutions without the traditional cost of image storage systems. It also creates widely accessible image repositories on a cost-effective, secure basis.

Figure 8:
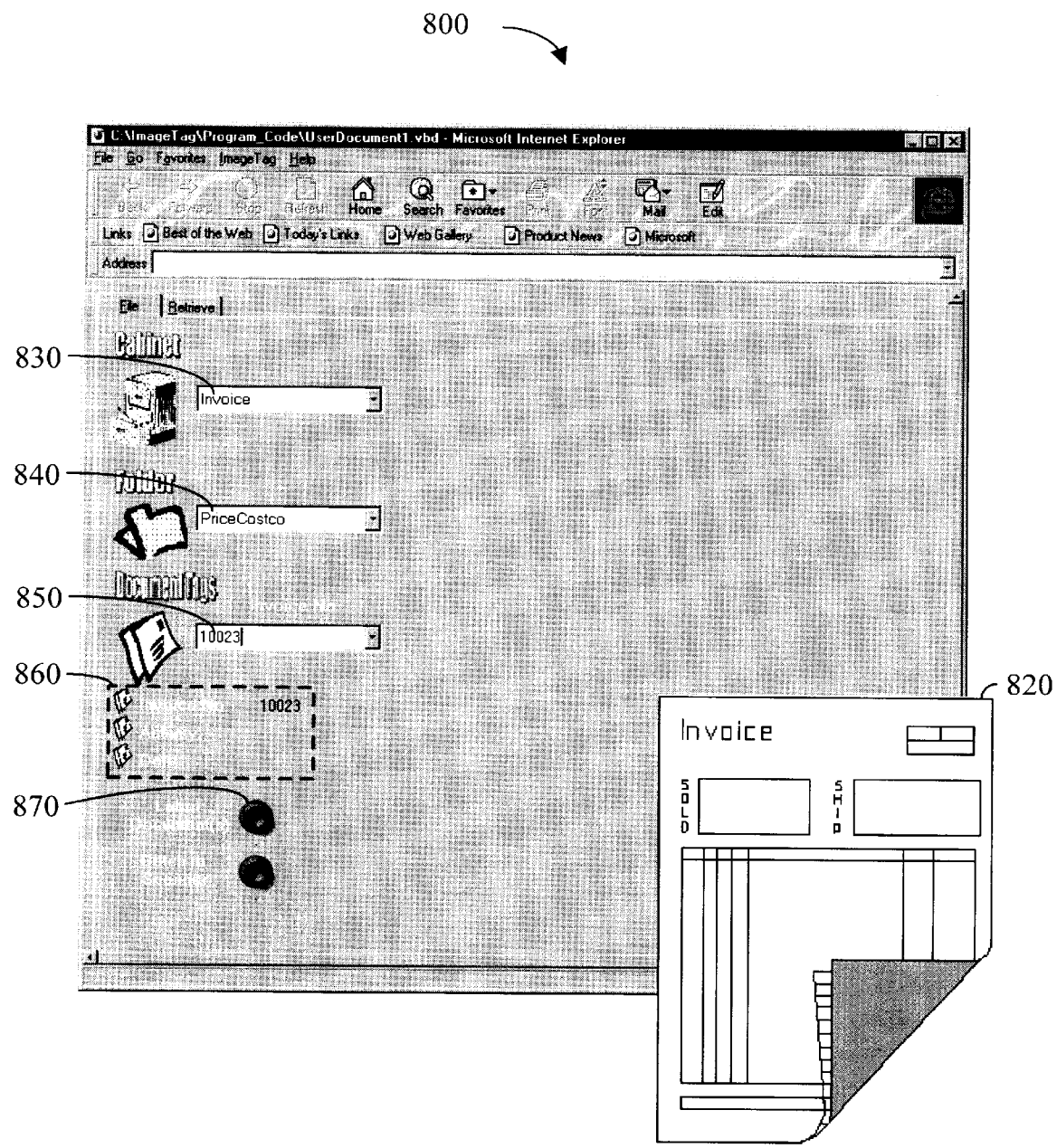
FIG. 8 is a screen shot of a web browser-based user interface for storing a document using a digital filing system according to a preferred embodiment of the present invention.

Referring now to FIG. 8, a user interface for indexing paper-based documents according to a preferred embodiment of the present invention is illustrated in conjunction with a web browser screen 800. As shown in FIG. 8, a paper-based document 820 is to be indexed, stored, and imaged for use with system 100. The user can use the web browser-based interface to specify the desired document storage category (cabinet) and subcategory (folder) in image repository 226. The user then adds any additional desired indexing information, using a series of predetermined index tag fields 860 for the documents in the selected cabinet and folder.

The index structure for logically storing documents is represented on web browser screen 800 by an electronic filing cabinet display 830, an electronic folder display 840, and a document tag display 850 which can display, in turn, each of the selected index tag fields 860. In the case of document 820, electronic filing display 830 shows that the user has selected the "Invoice" electronic filing cabinet as the desired location for the electronic image of document 820. Similarly, the user has selected electronic folder "Price-Costco" as the desired storage folder. Document tag display 850 contains the name of the document "10023." Rapid entry techniques are programatically implemented to speed the index process. The most preferred embodiments of the present invention will provide voice recognition features for data selection and entry, thereby allowing the user to quickly and easily index documents. It should be noted that the visual display shown in FIG. 8 lets the user select the logical location for storing the image of document 820 but digital filing application 227 will control the physical storage location of the digital image of document 820.

Once the user has entered the desired indexing values, the user clicks on a label button 870. This user action updates image index database 228 by creating a record for document 820. System 100 then assigns a unique document number for document 820 in a field in the newly created record using the document naming conventions described above in conjunction with FIGS. 5 and 6. The unique document number (and any other selected data) is transmitted to the user's workstation for printing by desktop labeling mechanism 202. As explained previously, label 400 (not shown) is used to identify document 820 and its assigned storage file name. Thus, when document 820 is later scanned, system 100 will store the image and reference the image for retrieval, using the previously generated document number as the file name.

Figure 9:
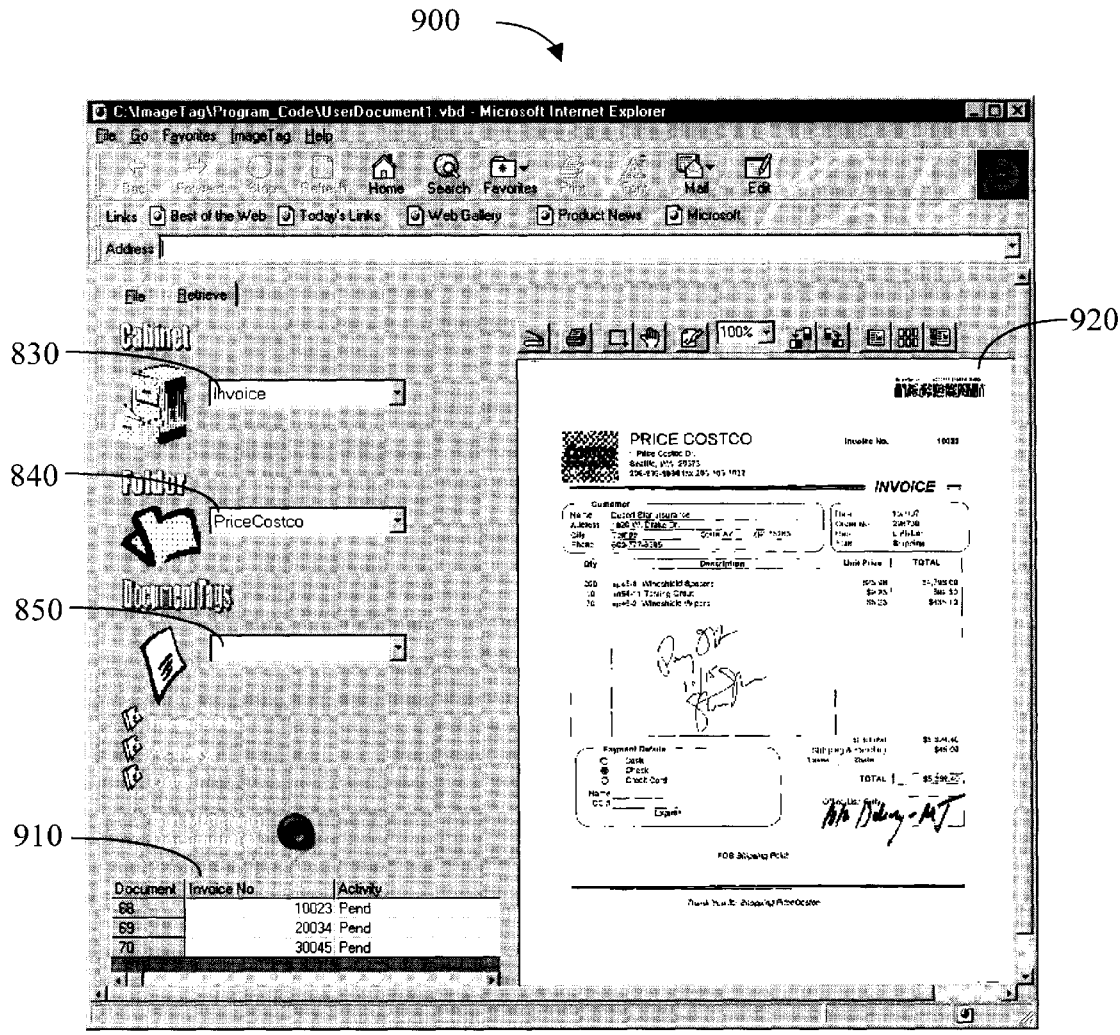
FIG. 9 is a screen shot of a web browser-based user interface for retrieving a document using a digital filing system according to a preferred embodiment of the present invention.

Referring now to FIG. 9, a user interface for retrieving previously indexed and imaged documents according to a preferred embodiment of the present invention is illustrated. Using the same web browser-based interface as shown in FIG. 8, the user has navigated back to the same electronic filing cabinet and electronic folder as when document 820 was indexed and named. As shown in FIG. 9, an electronic image 920 of paper-based document 820 is now displayed for the user in web browser window 900. In addition, other electronic document images stored in the same electronic cabinet and file folder are listed in scrolling list 910. Other electronic documents can be retrieved and displayed by selecting the desired electronic document from scrolling list 910 (i.e., by a mouse click, etc.). Retrieved document images can be printed, faxed, e-mailed, etc. by using the web browser's native capabilities and features.

It should be noted that even though FIGS. 8 and 9 illustrate the present invention in the context of Microsoft Internet Explorer, any and all web browsers can be configured to support the present invention. Microsoft Internet Explorer has been shown only for purposes of explaining various details of the present invention.

Figure 10:
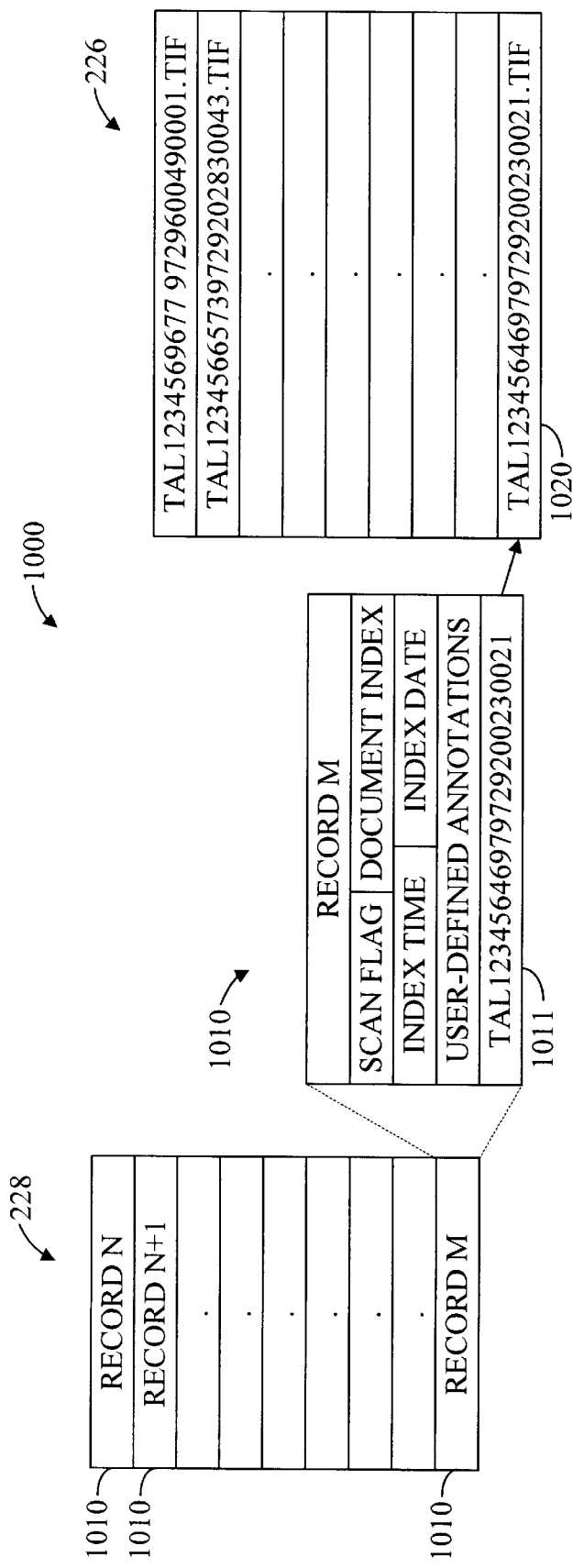
FIG. 10 is a block diagram of an image indexing and storage system according to a preferred embodiment of the present invention.

Referring now to FIG. 10, an indexing and storage system 1000 according to a preferred embodiment of the present invention is illustrated. As shown in FIG. 10, image index database 228 contains a series of records 1010. Each record 1010 contains a unique document number which is created by system 100 when a user indexes a paper-based document for inclusion in image repository 226 using the naming conventions explained above in conjunction with FIGS. 5 and 6. The unique document number for each record 1010 is stored in a field 1011 and, in this example, acts as a pointer to a specific image 1020 stored in image repository 226. As illustrated in FIG. 10, the name stored in field 1011 in each record 1010 is almost identical to the file name of the corresponding image stored in image repository 226. In the most preferred embodiments, the only difference between the document number and the corresponding image file name is the additional file name extension (.tif) for the image in image repository 226 which indicates that the referenced file is a TIFF file. As illustrated in FIG. 10, record 1010 may also contain additional fields for storing other information related to the image of the paper-based document. These other fields may include date and time of document indexing, a scan flag which indicates whether or not the paper-based document has been scanned or imaged, the document index information, user-defined annotations, etc.

Figure 11:
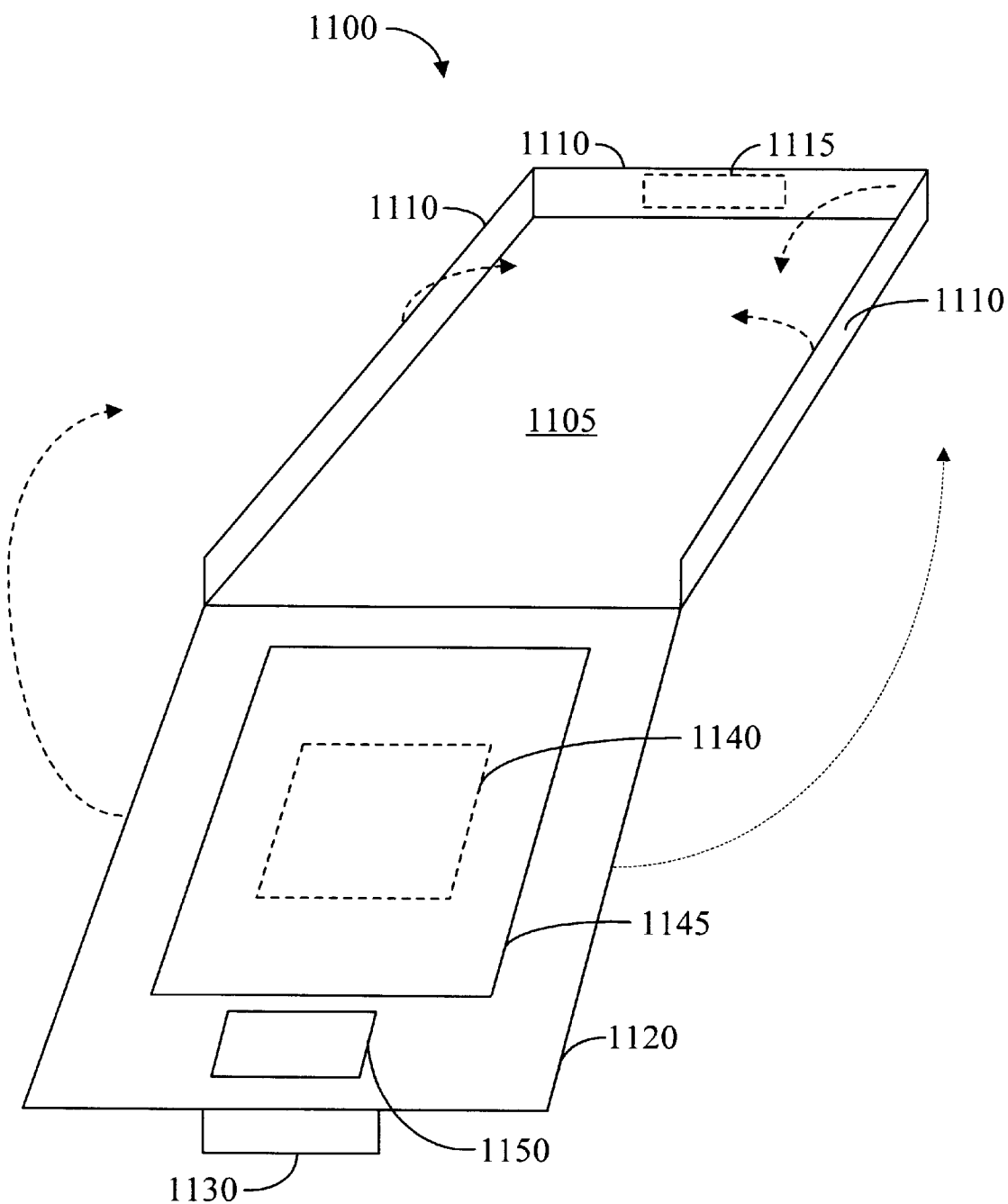
FIG. 11 is a perspective view of a folding out basket according to a preferred embodiment of the present invention.

Referring now to FIG. 11, a folding out basket 1100 according to a preferred embodiment of the present invention includes: a main portion 1105; three foldable sides 1110; a dual-sided hook-and-loop attachment portion 1115; a foldable cover 1120; a dual-sided hook-and-loop tab 1130; and optional sleeves or receptacles 1140, 1145, and 1150. In the most preferred embodiment, folding out basket 1100 will be placed in the vicinity of computer 200 to facilitate the convenient staging of paper-based documents as they are received by the user.

Folding out basket 1100 is constructed from a lightweight, yet heavy-duty material such as card stock or thin, flexible plastic. Foldable sides 1110 and foldable cover 1120 are attached to main portion 1105 of folding out basket 1100 so each of the sides 1110 and the cover 1120 function as foldable, repositionable flaps. In the most preferred embodiment, cover 1120 will large enough to completely cover main portion 1105 and sides 1110 will be large enough to at least partially cover main portion 1105.

Tab 1130 is a flat, two-sided tab which has a hook-and-loop material such as Velcro® on both flat surfaces. Tab 1130 is used to secure folding cover 1130 in one of two folded positions, either beneath folding out basket 1100 so as to be out of the way while paper-based documents are being placed in folding out basket 1100 or, alternatively, over the top of the documents placed in folding out basket 1100, thereby securing the documents in place. Attachment portion 1115 cooperates with tab 1130 to secure foldable cover 1120 in one of two positions, either over the top of folding out basket 1100 or beneath folding out basket 1100.

To use folding out basket 1100, a user rotates folding cover 1120 beneath main portion 1105 of folding out basket 1100 and secures it in place using attachment portion 1115 and tab 1130. The user then simply stacks indexed and labeled documents onto main portion 1105 of folding out basket 1100 during the course of processing incoming paper-based documents. When the user is ready to have the documents scanned or imaged, foldable sides 1110 are folded towards main portion 1105 of folding out basket 1100, at least partially covering the papers stacked in folding out basket 1100. Then, foldable cover 1120 is rotated and folded over the top of the documents in folding out basket 1100 and secured to attachment portion 1115 with tab 1130 so as to cover and secure the documents stacked in folding out basket 1100. Once foldable sides 1110 and foldable cover 1120 are folded over the documents, folding out basket 1100 can be transported to the scanning/imaging location for input into system 100. The exact dimensions of folding out basket 1100 will be determined based on the number and dimensions of the papers to be staged and stored in folding out basket 1100.

Optional sleeves or receptacles 1140, 1145, and 1150 are used to contain user identification and any type of special instructions the user desires to include for processing paper-based documents such as unique handling directions or routing information. In addition, pre-printed "special handling" cover sheets to set up the scanner for each specific scanning job could be included in external sleeve or receptacle 1140 or internal receptacle 1145.

As explained above, the present invention provides an apparatus and method for a digital filing system. The preferred embodiments of the present invention provide for easy and effective indexing, imaging, storing, retrieving and managing of paper-based documents, transforming them into electronic documents using a system which incorporates many existing office resources. The proposed system and method implements a desktop solution for digital filing, which can be made available to each worker. In one embodiment of the present invention, an individual has complete control over the electronic storage and retrieval of their documents from a standard desktop computer, using a standard web browser application. Uniquely, the digital filing system of the present invention also allows users to index and label documents prior to scanning/imaging by using a dedicated desktop labeling mechanism.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
    at least one processor;
    a memory coupled to the at least one processor;
    a labeling mechanism, the labeling mechanism providing an attachable label that includes a computer readable unique document identifier for identifying an attached paper-based document; and
    a digital filing application residing in the memory and being executed by the at least one processor, the digital filing application parsing a scanned image of the paper-based document that includes the attachable label for the unique document identifier the digital filing application using the parsed unique document identifier to link the scanned image of the paper-based document to a previously created record for the paper based document in an image index database.

2. The apparatus of claim 1 further comprising a communication link coupled to the at least one processor.

3. The apparatus of claim 2 wherein the communication link comprises a computer network.

4. The apparatus of claim 3 wherein the digital filing application transfers the digital image of the paper-based document to an image storage mechanism via the communication link.

5. The apparatus of claim 1 wherein the labeling mechanism provides the attachable labels by dispensing adhesive backed printed labels.

6. The apparatus of claim 1 wherein the labeling mechanism applies the attachable label to the paper based document.

7. The apparatus of claim 6 wherein the labeling mechanism comprises a printer for printing the machine readable unique document identifier on the paper based document.

8. The apparatus of claim 6 wherein the labeling mechanism comprises a printer, the printer providing the attachable labels by printing the machine readable unique document identifier on adhesive backed labels.

9. An apparatus comprising:

at least one processor;

a memory coupled to the at least one processor;

a labeling mechanism, the labeling mechanism providing an attachable label that includes a computer-readable unique document identifier for identifying an attached paper-based document;

an image indexer residing in the memory, the image indexer providing an interface for users to enter document index information for the paper-based document, the document index information including the unique document identifier;

an image repository residing on an image storage mechanism, the image repository storing a scanned digital image of the paper-based document, the scanned digital image of the paper-based document including a scanned image of the attachable label;

a digital filing application residing in the memory and being executed by the at least one processor, the digital filing application parsing the scanned digital image of the paper-based document that includes the attachable label for the unique document identifier, the digital filing application using the parsed unique document identifier to link the scanned digital image of the paper-based document to the document index information for the paper-based document.

10. The apparatus of claim 9 wherein the digital filing application comprises a web browser-based user interface.

11. The apparatus of claim 9 wherein the digital filing application transfers the image of the document from the image repository via a computer network.

12. The apparatus of claim 11 wherein the computer network is the Internet.

13. The apparatus of claim 11 wherein the computer network is an intranet.

14. The apparatus of claim 9 further comprising a folding out basket.

15. The apparatus of claim 14 wherein the folding out basket comprises:

a main portion;

a plurality of repositionable side portions attached to the main portion;

a repositionable cover attached to the main portion;

a flat, two-sided hook-and-loop covered tab portion attached to the repositionable cover; and a cooperating hook-and-loop attachment portion affixed to at least one of the plurality of repositionable side portions.

16. The apparatus of claim 14 wherein the folding out basket further comprises at least one sleeve affixed to the repositionable cover.

17. The folding out basket of claim 14 wherein the plurality of repositionable side portions and the repositionable cover are comprised of a flexible plastic material.

18. The apparatus of claim 9 wherein the label additionally comprises:

an eye-legible information portion; and wherein the computer-readable unique document identifier is implemented in a computer-readable bar code portion.

19. The apparatus of claim 18 wherein the unique document identifier comprises:

a software serial number field;

a security field;

a date field;

a UserID field; and a document counter field.

20. The apparatus of claim 9 wherein the labeling mechanism provides the attachable labels by dispensing adhesive backed printed labels.

21. The apparatus of claim 9 wherein the labeling mechanism applies the attachable label to the paper based document.

22. The apparatus of claim 21 wherein the labeling mechanism comprises a printer for printing the machine readable unique document identifier on the paper based document.

23. The apparatus of claim 21 wherein the labeling mechanism comprises a printer, the printer providing the attachable labels by printing the machine readable unique document identifier on adhesive backed labels.

24. An apparatus for digital filing, the apparatus comprising:

at least one processor;

a memory coupled to the at least one processor;

a labeling mechanism, the labeling mechanism providing an attachable label that includes a computer-readable unique document identifier for identifying an attached paper-based document;

an image indexer residing in the memory, the image indexer providing an interface for users to enter document index information for the paper-based document, the document index information including the unique document identifier;

a document input mechanism, the document input mechanism creating a scanned digital image of the paper-based document, the scanned digital image of the paper-based document including a scanned image of the attachable label;

a communication link coupled to the at least one processor;

an image storage mechanism coupled to the communication link;

an image repository stored on the image storage mechanism, the image repository storing the scanned digital image of the paper-based document; and a digital filing application residing in the memory and being executed by the processor; wherein the digital filing application parses the scanned digital image of the paper-based document that includes the attachable label for the unique document identifier, the digital filing application using the parsed unique document identifier to link the scanned digital image of the paper-based document stored in the image repository to the document index information for the paper-based document.

25. The apparatus of claim 24 wherein the digital filing application comprises a web browser-based application.

26. The apparatus of claim 24 wherein the document input mechanism is a multi-function copier.

27. The apparatus of claim 24 wherein the document input mechanism is a fax machine.

28. The apparatus of claim 24 wherein the document input mechanism is a scanner.

29. The apparatus of claim 24 wherein the communication link is a computer network and wherein the image is transferred from the document input mechanism to the image repository via the computer network.

30. The apparatus of claim 29 wherein the computer network is the Internet.

31. The apparatus of claim 29 wherein the computer network is an intranet.

32. The apparatus of claim 24 wherein the label additionally comprises:
an eye-legible information portion; and
wherein the computer-readable unique document identifier is implemented in a computer-readable bar code portion.

33. The apparatus of claim 32 wherein the unique document identifier comprises:
a software serial number field;
a security field;
a date field;
a UserID field; and
a document counter field.

34. A method comprising the steps of:
affixing a label bearing a machine-readable document identifier to a paper-based document;
entering indexing information for the paper-based document, the indexing information including identification data corresponding to the machine-readable document identifier;
subsequently scanning the paper-based document and creating a digital image of the paper-based document, the digital image including a digital image of the machine-readable document identifier;
parsing the digital image of the paper-based document for the machine-readable document identifier;
storing the digital image in an image repository;
linking the stored digital image of the paper-based document to the indexing information using the parsed machine-readable document identifier.

35. The method of claim 34 wherein the step of affixing a label to the paper-based document comprises the step of using a desktop labeling mechanism to affix the label to the paper-based document.

36. The method of claim 34 further comprising the step of retrieving the digital image from the image repository using the linked index information.

37. The method of claim 34 further comprising the step of using a desktop labeling mechanism to create the label bearing the machine-readable document identifier.

38. A computer-implemented method for the digital filing of paper-based documents, the method comprising the steps of:
receiving a paper-based document;
creating a database record for the paper-based document;
storing a unique document identifier for the paper-based document in the database record;
affixing a label to the paper-based document, the label including the unique document identifier;
scanning the paper-based document to create a digital image of the paper-based document, the digital image including an image of the label;
extracting the unique document identifier from the digital image of the paper-based document; and
storing the digital image of the paper-based document in an image repository using a file name which that corresponds to the unique document identifier.

39. The method of claim 38 further comprising the step of retrieving the image of the paper-based document using the file name.

40. The method of claim 38 further comprising the step of using a desktop labeling mechanism to generate the label for the paper-based document.

41. The method of claim 38 wherein the step of storing the image of the paper-based document in an image repository comprises the step of transferring the image of the paper-based document to the image repository via a dial-up phone line.

42. The method of claim 38 wherein the step of storing the image of the paper-based document in an image repository comprises the step of transferring the image of the paper-based document to the image repository via a computer network.

43. The method of claim 42 wherein the computer network is the Internet.

44. The method of claim 42 wherein the computer network is an intranet.

45. A method comprising the steps of:
receiving a paper-based document;
creating a record in an image index database for the paper-based document, the record having at least one field;
storing a unique document identifier for the paper-based document in the at least one field;
affixing a label to the paper-based document, the label bearing a bar code indicia which corresponds to the unique document identifier;
scanning the paper-based document and creating an image of the paper-based document and the affixed label; and
storing the image in an image repository;
parsing the image of the paper-based document for the unique document identifier;
linking the stored image of the paper-based document to the record in the image index database using the unique document identifier.

46. The method of claim 45 further comprising the step of retrieving the image from the image repository using a web browser-based interface.

47. The method of claim 45 wherein the step of storing the image in an image repository comprises the step of transferring the image to the image repository via the Internet.

48. The method of claim 45 wherein the step of storing the image in an image repository comprises the step of transferring the image to a CD-ROM disk.

49. The method of claim 45 wherein the step of storing the image in an image repository comprises the step of transferring the image to a DVD disk.

50. A method for indexing, storing, and retrieving a digital image of a paper-based document, the method comprising the steps of:

receiving the paper-based document;

launching a web-based interface for indexing the paper-based document;

creating a record in an image index database for the paper-based document, the record having at least one field;

storing a unique document identifier for the paper-based document in the at least one field;

using a desktop labeling mechanism to provide a label, the label bearing a bar code indicia which includes the unique document identifier;

affixing the label to the paper-based document;

scanning the paper-based document and label affixed to the document, thereby creating a digital image of the paper-based document and the affixed label;

parsing the unique document number from the digital image of the paper-based document;

transferring the digital image to an image repository via the Internet;

storing the digital image in the image repository;

linking the stored digital image of the paper-based document to the record in the image index database using unique document identifier.

51. A program product comprising:

a digital filing application, the digital filing application receiving a scanned image of a paper-based document that includes an attached label having a unique document identifier, the digital filing application parsing the scanned image for the unique document identifier, the digital filing application using the parsed unique document identifier to link the scanned image of the paper-based document to a previously created record for the paper based document in an image index database; and signal bearing media bearing the digital filing application.

52. The program product of claim 51 wherein the digital filing application is implemented as a web browser based application.

53. The program product of claim 51 wherein the signal bearing media comprises recordable media.

54. The program product of claim 51 wherein the signal bearing media comprises transmission media.

55. The apparatus of claim 51 wherein the labeling mechanism provides the attachable labels by dispensing adhesive backed printed labels.

56. The apparatus of claim 51 wherein the labeling mechanism applies the attachable label to the paper based document.

57. The apparatus of claim 56 wherein the labeling mechanism comprises a printer for printing the machine readable unique document identifier on the paper based document.

58. The apparatus of claim 56 wherein the labeling mechanism comprises a printer, the printer providing the attachable labels by printing the machine readable unique document identifier on adhesive backed labels.

59. A method comprising the steps of:

providing a machine-readable label for a paper-based document at a first geographic location, the label containing a document identifier which will subsequently be used as a reference for a digital image of the paper-based document;

affixing the label to the paper-based document;

transporting the paper-based document to a second geographic location;

scanning the paper-based document, including the label, to create a document image which includes an image of the label;

parsing the document image of the paper-based document for the unique document identifier;

storing the document image in an image repository, the image repository being in a third geographic location; and linking the stored image of the paper-based document to the record in the image index database using the unique document identifier.

60. The method of claim 59 wherein the step of creating a label for a paper-based document comprises the step of using a desktop labeling mechanism to create the label.

61. The method of claim 59 wherein the first, second, and third geographic locations are separated by a distance of greater than 1 mile.

62. A method comprising the steps of:

using a desktop computer to index a paper-based document, thereby providing a unique document identifier for the paper-based document;

storing the unique document identifier in an image index database;

affixing a label containing the unique document identifier to the paper-based document;

transporting the paper-based document to a document input mechanism which is logically disconnected from the desktop computer;

creating a digital image of the paper-based document;

retrieving the unique document identifier from the digital image of the paper-based document;

incorporating the document identifier into a file name for the digital image to link the digital image to the image index database; and storing the digital image of the paper-based document on an image storage mechanism which is logically disconnected from the desktop computer, the document input mechanism, and the image index database, using the file name.

63. The method of claim 62 further comprising the step of logically connecting the desktop computer to the image storage mechanism and retrieving the digital image of the paper-based document.

64. The method of claim 63 wherein the step of retrieving the digital image of the paper-based document from the image storage mechanism is accomplished via a computer network.

65. The method of claim 63 wherein the step of retrieving the digital image of the paper-based document is accomplished by using a web browser-based interface to retrieving the digital image of the paper-based document.

* * * * *